United States Patent
Li et al.

(10) Patent No.: US 10,450,797 B2
(45) Date of Patent: Oct. 22, 2019

(54) ROLLING SHUTTER DRIVING DEVICE AND ROLLING SHUTTER APPARATUS UTILIZING SAME

(71) Applicant: Johnson Electric S.A., Murten (CH)

(72) Inventors: Yue Li, Hong Kong (CN); Chui You Zhou, Shenzhen (CN); Wei Zhang, Shenzhen (CN); Yong Gang Zhang, Shenzhen (CN); Ming Chen, Shenzhen (CN); Yong Wang, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 238 days.

(21) Appl. No.: 15/590,720

(22) Filed: May 9, 2017

(65) Prior Publication Data

US 2017/0321480 A1 Nov. 9, 2017

(30) Foreign Application Priority Data

May 9, 2016 (CN) .......................... 2016 1 0303732
May 9, 2016 (CN) .......................... 2016 1 0304025

(51) Int. Cl.
| | | |
|---|---|---|
| *E06B 9/68* | (2006.01) | |
| *E06B 9/82* | (2006.01) | |
| *H02K 7/116* | (2006.01) | |
| *H02K 21/14* | (2006.01) | |
| *H02K 7/102* | (2006.01) | |
| *E06B 9/80* | (2006.01) | |

(52) U.S. Cl.
CPC ................. *E06B 9/68* (2013.01); *E06B 9/82* (2013.01); *H02K 7/116* (2013.01); *H02K 21/14* (2013.01); *E06B 2009/801* (2013.01)

(58) Field of Classification Search
CPC ..... E06B 9/68; E06B 9/70; E06B 9/80; E06B 9/82; E06B 2009/801; H02K 7/1021; H02K 7/1028; H02K 7/116; H02K 2207/03

See application file for complete search history.

(56) References Cited

U.S. PATENT DOCUMENTS

| | | | |
|---|---|---|---|
| 2005/0184691 A1* | 8/2005 | Cavarec ..................... | E06B 9/68 318/375 |
| 2014/0014281 A1* | 1/2014 | Mullet ....................... | E06B 9/42 160/311 |
| 2016/0245018 A1* | 8/2016 | Pohjonen .................. | E06B 9/80 |

(Continued)

FOREIGN PATENT DOCUMENTS

| | | |
|---|---|---|
| CN | 104348268 A | 2/2015 |
| CN | 204190552 U | 3/2015 |

*Primary Examiner* — Daniel J Rohrhoff
(74) *Attorney, Agent, or Firm* — Muncy, Geissler, Olds & Lowe, P.C.

(57) ABSTRACT

A rolling shutter driving device includes a motor, a locking assembly and a gearbox. The motor includes a stator and a rotor. The rotor includes a rotary shaft connected to the gearbox. The rotary shaft drives through the gearbox a rolling shutter to extend or retract. The locking assembly includes a brake pad slidingly fitted on the rotary shaft and a rotary member fixedly mounted to the rotary shaft. The brake pad is circumferentially fixed relative to the stator. The brake pad is slidable relative to the rotary shaft so as to be selectively engaged with the rotary member to lock the rotary shaft and hence hold the load in position, or disengaged from the rotary member to unlock the rotary shaft.

20 Claims, 10 Drawing Sheets

(56) References Cited

U.S. PATENT DOCUMENTS

2017/0089134 A1* 3/2017 Hsieh .................... E06B 9/80
2017/0321480 A1* 11/2017 Li ........................ E06B 9/68
2018/0283076 A1* 10/2018 Gorosin ............... E05F 15/622

* cited by examiner

ROLLING SHUTTER DRIVING DEVICE AND ROLLING SHUTTER APPARATUS UTILIZING SAME

CROSS REFERENCE TO RELATED APPLICATIONS

This non-provisional patent application claims priority under 35 U.S.C. § 119(a) from Patent Application No. 201610303732.7 and No. 201610304025.X filed in The People's Republic of China on May 9, 2016.

FIELD OF THE INVENTION

The present invention relates to driving devices, and in particular to a rolling shutter driving device for driving a window curtain, a shutter, a projection screen in a room or in a car.

BACKGROUND OF THE INVENTION

Rolling shutters are common furniture in our lives. With continuous development of the technology of the rolling shutters, the rolling shutters are becoming more and more widely used for windows of some premium cars. Currently, in a common car window rolling shutter, retraction or extension of the rolling shutter is usually driven by a driving motor, an ideal stop position of the rolling shutter is controlled by a controller, and the rolling shutter is held at a desired position by self-locking of the motor. However, due to the over large weight of the rolling shutter itself, the current motors may not have sufficient self-locking capability to completely hold the rolling shutter at the desired position.

SUMMARY OF THE INVENTION

Thus, there is a desire for a rolling shutter driving device which can achieve stable locking.

There is also a desire for a rolling apparatus that utilizes the above rolling shutter driving device.

A rolling shutter driving device includes a motor, a locking assembly and a gearbox. The motor includes a stator and a rotor rotatable relative to the stator. The rotor includes a rotary shaft connected to the gearbox. The rotary shaft of the motor is configured to drive through the gearbox a rolling shutter connected to one end of the gearbox. The locking assembly includes a brake pad circumferentially fixed relative to the stator and a rotary member circumferentially fixed relative to the rotary shaft. The rotary member is fixed relative to the rotary shaft. The brake pad is slidable axially relative to the rotary shaft between a locking position where the brake pad is engaged with the rotary member to lock the rotary shaft and hence hold the rolling shutter in position, and an unlocking position where the brake pad is disengaged from the rotary member to unlock the rotary shaft.

Preferably, the locking assembly further comprises a magnetic conductive ring and a resilient element, the magnetic conductive ring is slidingly fitted on the rotary shaft and keeps connecting with the brake pad, the resilient element resists against the brake pad thereby forcing the brake pad towards the locking position, the stator of the motor comprises a winding, which, once energized, generates an electromagnetic force to force the magnetic conductive ring and the brake pad to move axially along the rotary shaft towards the unlocking position overcoming a resilient force of the resilient element.

Preferably, the motor further comprises an end cap disposed at an end of the stator, the locking assembly is disposed at an end of the motor far away from the end cap, the rotor is supported by the end cap and the locking assembly, and the rotor rotates around the stator under the action of the electromagnetic force of the winding.

Preferably, the winding is a concentrated winding.

Preferably, one side of the brake pad is provided with an accommodating portion for accommodating the magnetic conductive ring, the other side of the brake pad is provided with a plurality of extensions, and the extensions are engaged with the rotary member in response to the brake pad moves to the locking position.

Preferably, the rotary member defines a plurality of through holes, each extension is selectively engaged in one of the through holes in response to the brake pad moves to the locking position.

Preferably, the extensions and the through holes are arranged circumferentially, and are respectively disposed on brake pad and rotary member at even interval.

Preferably, the motor further comprises a housing fixed disposed at an end of the stator opposite to the end cap and close to the locking assembly, the housing of the motor is formed with a plurality limiting slots extending axially, an outer circumferential side of the brake pad is provided with a plurality of sliding blocks, each sliding block is fitted in a corresponding one of the limiting slots, and axially slidable in the corresponding limiting slot.

Preferably, the locking assembly further comprises a sleeve with a bearing seat disposed therein, a bearing is mounted in the bearing seat to support one of two opposite ends of the rotary shaft, one end of the sleeve is connected to the housing of the motor, and the other end of the sleeve is connected to the gearbox.

Preferably, the end of the sleeve is provided with a plurality of engagement blocks each engaged in one of the limiting slots.

Preferably, the end cap comprises another bearing seat with another bearing received therein to support the other one end of the rotary shaft.

Preferably, the resilient element sandwiched between the stator of the motor and the magnetic conductive ring.

Preferably, the stator comprises a yoke, a plurality of stator teeth radially extending for the yoke, a first winding bracket fixed to one of opposite axial ends of the plurality of the stator teeth close to the locking assembly, and a second winding bracket fixed to the other one axial end of the plurality of the stator teeth far away from the locking assembly, one of opposite axial ends of the yoke abuts the housing of the motor.

Preferably, the first winding bracket defines a receiving portion, one end of the resilient element received in the receiving portion and resists against the first winding bracket, the other end of the resilient element resists against the magnetic conductive ring.

Preferably, the first winding bracket axially extends a distance beyond the yoke, such that the winding mounted on the first winding brackets is partially located outside the yoke of the stator.

Preferably, the gearbox comprises a plurality of transmission gears and a transmission member mounted in the gearbox, the transmission gears are directly or indirectly connected to the rotary shaft, the transmission member is connected to the rolling shutter, and the rotary shaft drives the plurality of transmission gears to rotate which in turn drive the transmission member to drive the rolling shutter to rotate.

Preferably, the rolling shutter driving device further comprises a outer shell receiving the motor and the gearbox.

A rolling shutter apparatus includes a rolling shutter. The rolling shutter apparatus further comprises the rolling shutter driving device as described above, and the rolling shutter driving device is configured to drive the rolling shutter to retract or extend.

Figure 1:
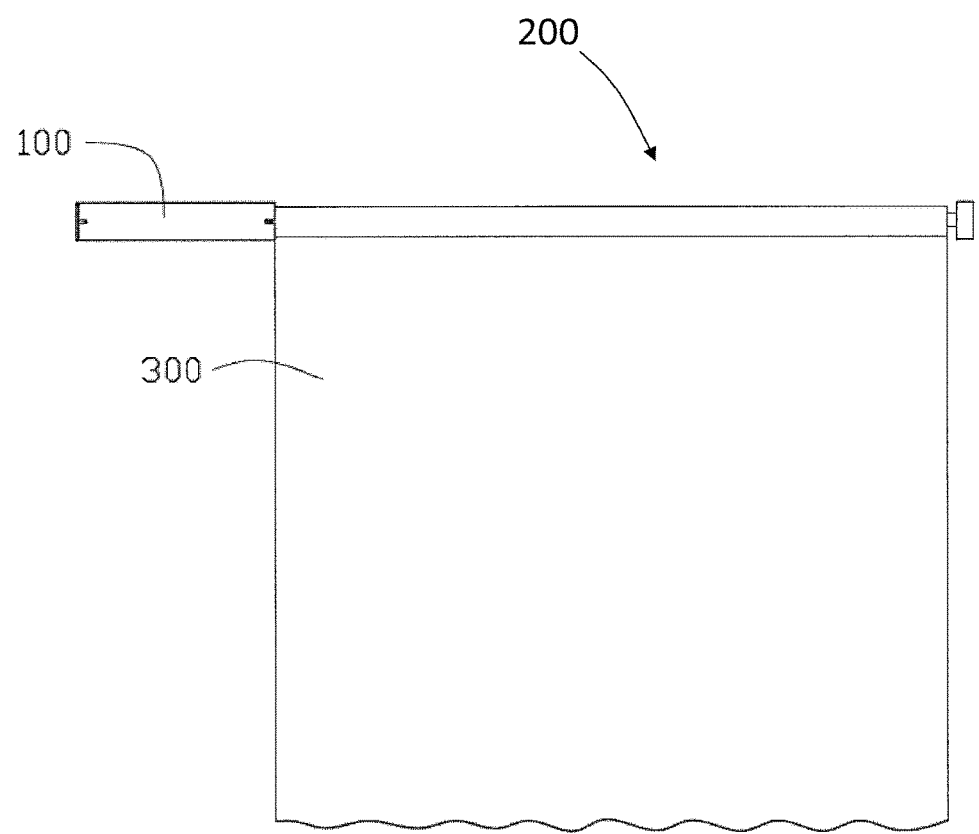
FIG. 1 is a plane view of a rolling shutter apparatus according to one embodiment of the present invention.

The present invention will be further described below with reference to the above drawings and the following embodiments.

DETAILED DESCRIPTION OF THE PREFERRED EMBODIMENTS

Various embodiments of the present invention will be described as follows with reference to the accompanying drawings. Elements of similar structures or functions are generally represented by like reference numerals for illustrative purposes throughout the specification and figures. The figures are for the purposes of illustration only and should not be regarded as limiting. The figures are not drawn to scale and do not illustrate every aspect of the described embodiments. Unless otherwise specified, all technical and scientific terms have the ordinary meaning as commonly understood by people skilled in the art.

It is noted that, when a component is described to be "fixed" to another component, it can be directly fixed to the another component or there may be an intermediate component. When a component is described to be "connected" on another component, it can be directly connected to the another component or there may be an intermediate component. When a component is described to be "disposed" on another component, it can be directly disposed on the another component or there may be an intermediate component.

Figure 2:
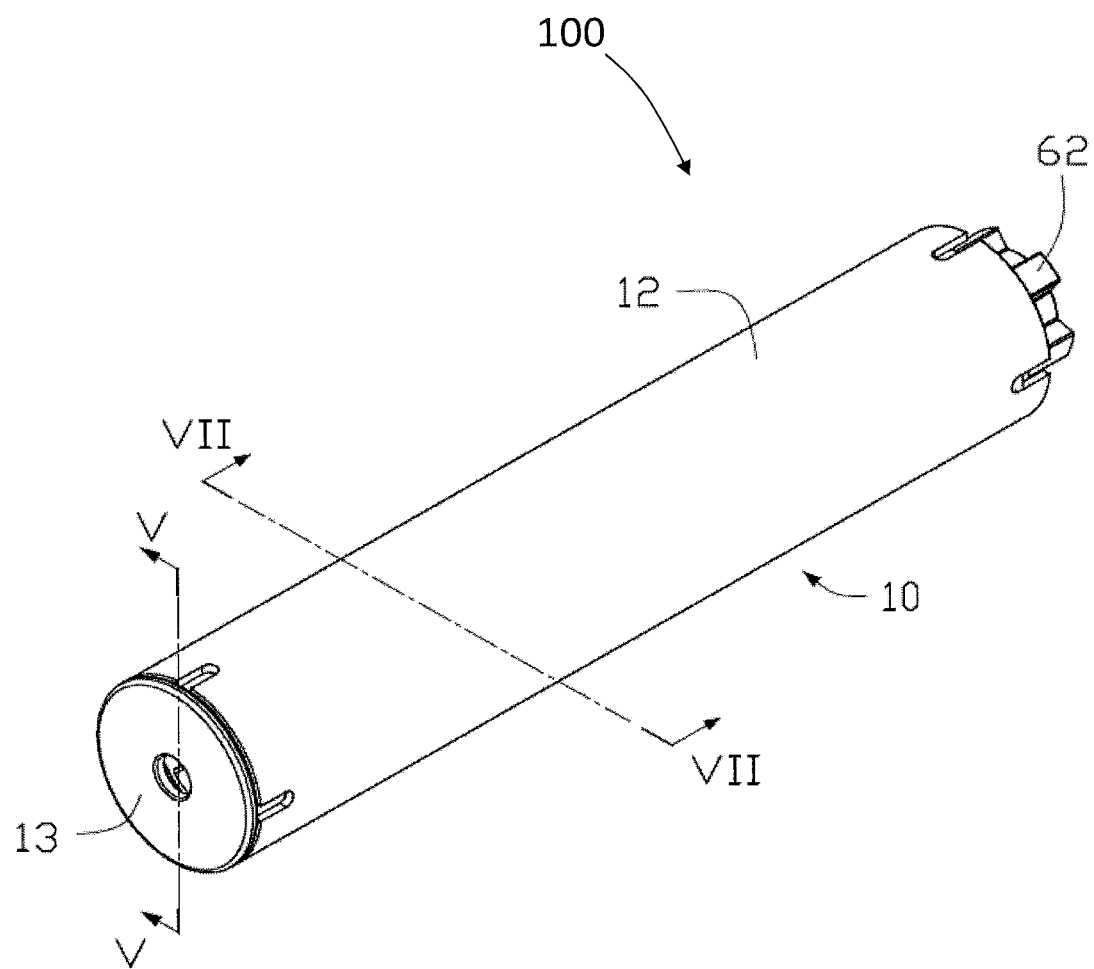
FIG. 2 is a perspective view of the rolling shutter driving device according to one embodiment of the present invention.
Figure 3:
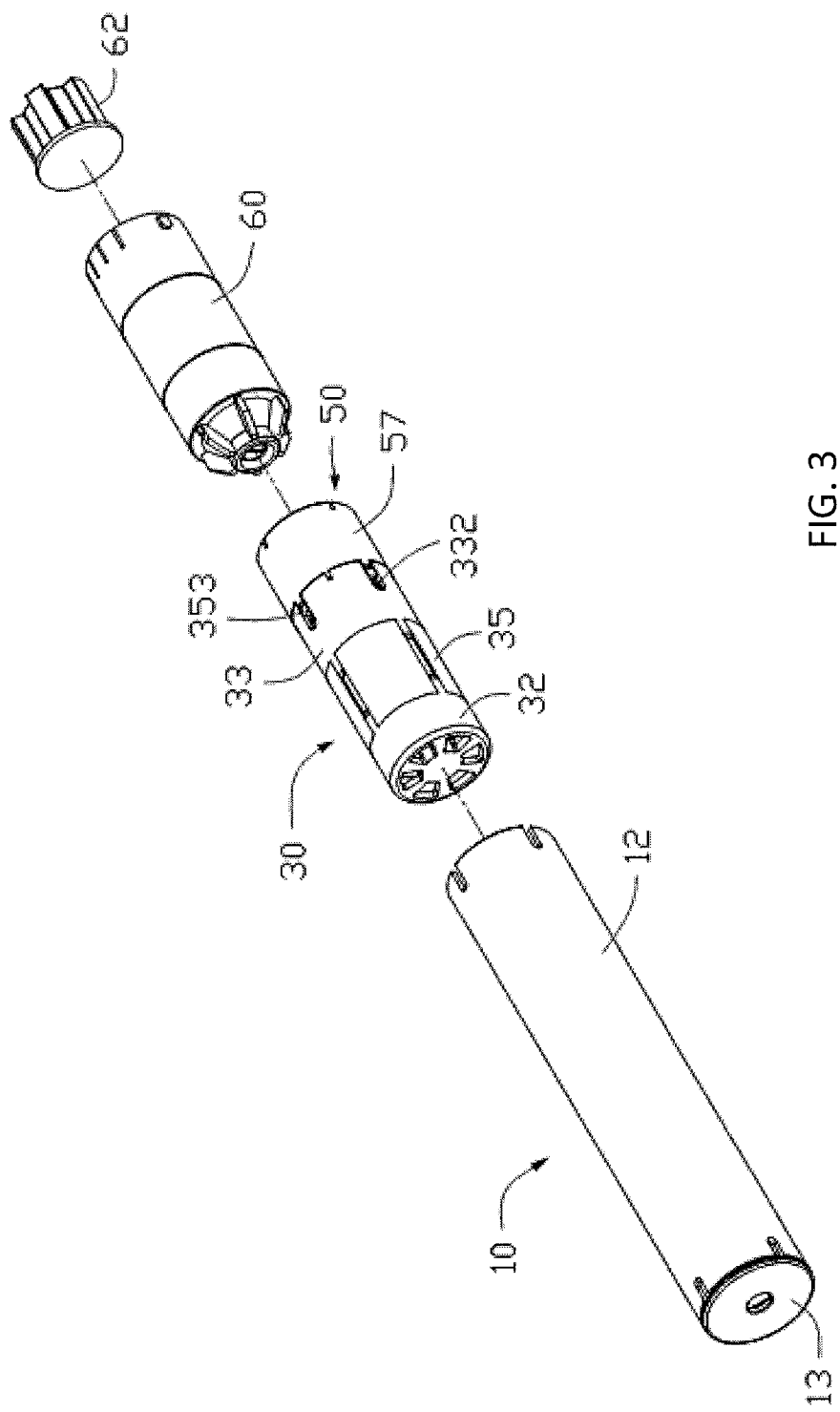
FIG. 3 is a partially exploded view of the rolling shutter driving device of FIG. 2.

Referring to FIG. 1 to FIG. 3, a rolling shutter apparatus 200 in accordance with an embodiment of the present invention, such as a home-use window curtain, a car window curtain, a screen, a rolling shutter door, a door curtain, includes a driving device 100 for driving a rolling shutter that retracts and extends via a rolling action. The rolling shutter driving device 100 includes an outer shell 10, and a motor 30, a locking assembly 50 and a speed reduction mechanism such as a gearbox 60 mounted in the outer shell 10. The locking assembly 50 and the gearbox 60 perform an axial movement or a rotational movement under the driving of the motor. In this embodiment, the locking assembly 50 is attached around one end of the motor 30, and the gearbox 60 is disposed at one end of the locking assembly 50 opposite from the motor 30. The motor 30 drives the gearbox 60 which in turn drives the load connected to one end of the gearbox 60, such as a rolling shaft of the rolling shutter, to rotate. The locking assembly 50 is slidable along an axial direction of the motor 30 so as to lock the motor 30 and the gearbox 60 and hence hold a position of the load when the motor 30 stops rotation. The gearbox 60 is used to convert a high speed rotation of the motor 30 into rotation of a preset speed outputted to the load.

The outer shell 10 sleeves the motor 30 and the gearbox 60. In this embodiment, the outer shell 10 includes an cylindrical wall 12 and a cap 13. The cylindrical wall 12 has a shape matching with an outer shape of the motor and gearbox 60 and is generally in the form of a hollow cylindrical structure, such that the cylindrical wall 12 is able to cover and to protect the motor 30 and the gearbox 60. The cap 13 covers one end of the cylindrical structure of the cylindrical wall 12, which is detachable relative to the cylindrical wall 12 thereby facilitating repair and replacement of the rolling shutter device 100.

Figure 4:
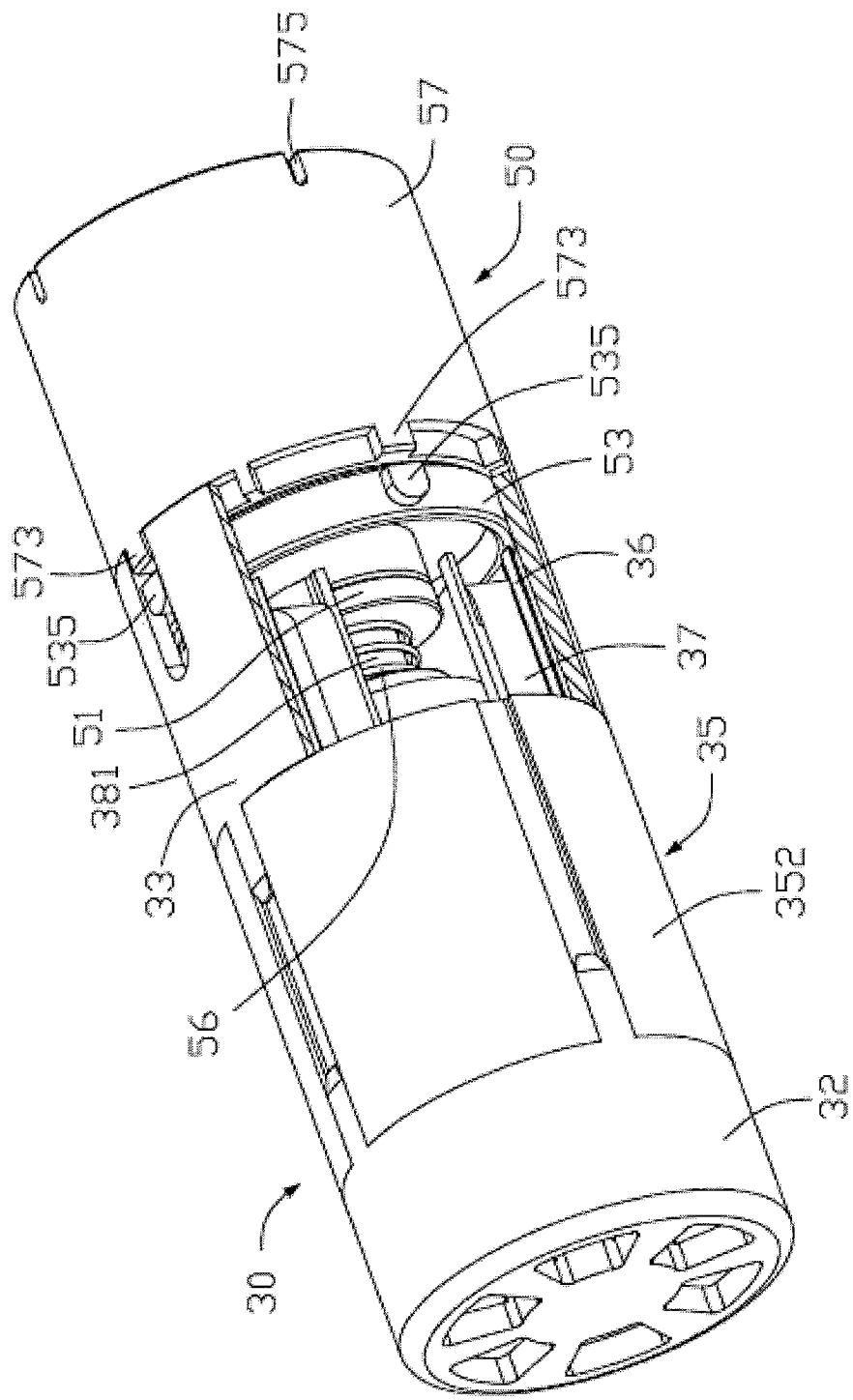
FIG. 4 is a partial sectional view of a motor of the rolling shutter driving device of FIG. 3.
Figure 5:
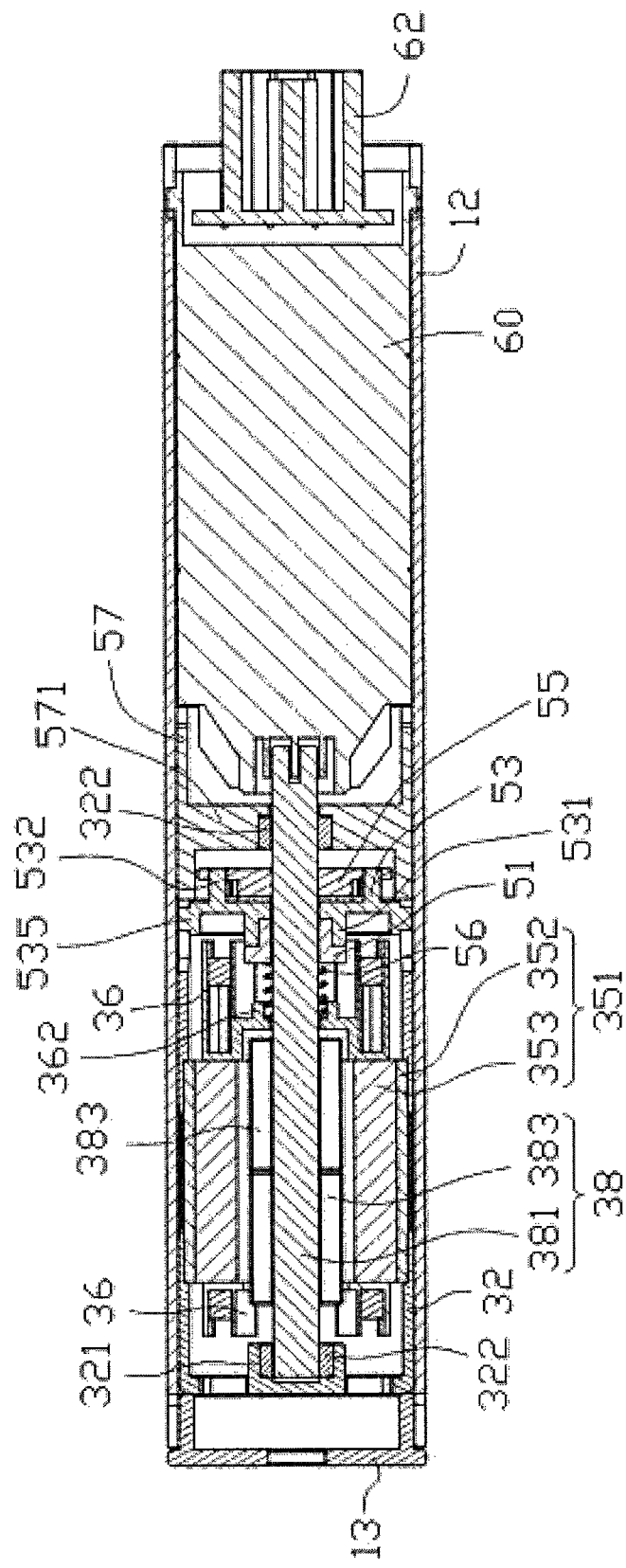
FIG. 5 is a sectional view of the rolling shutter driving device of FIG. 2, taken along line V-V thereof.

Referring to FIG. 4 and FIG. 5, in this embodiment, the motor 30 is a single phase synchronous motor. It should be understood that the motor may also be a three phase motor in an alternative embodiment. The motor 30 includes an end cap 32, a housing 33, a stator 35, two winding brackets 36 and a rotor 38. The end cap 32 and the housing 33 are used to mount the stator 35, winding brackets 36 and rotor 38. In the illustrated embodiment, the end cap 32 and the housing 33 are disposed at opposite ends of a yoke 352 of the stator 35. The end cap 32 and the housing 33 are connected to the yoke 352 through but not limited to snap-fit, adhering or soldering. It should be understood that, in another embodiment, the yoke 352 of the stator 35 may also be completely enclosed in an interior of the end cap 32 and housing 33. The end cap 32 includes a bearing seat 321 for receiving therein a bearing 322 for supporting the rotor 38. One end of the housing 33 opposite from the end cap 32 defines a plurality of limiting slots 332 (FIG. 3). In this embodiment, the limiting slots 332 are arranged at even interval along a circumferential wall of the housing 33, with each limiting slot 332 in communication with an open end of the housing 33. The limiting slots 332 are used to engage with the locking assembly 50.

Figure 6:
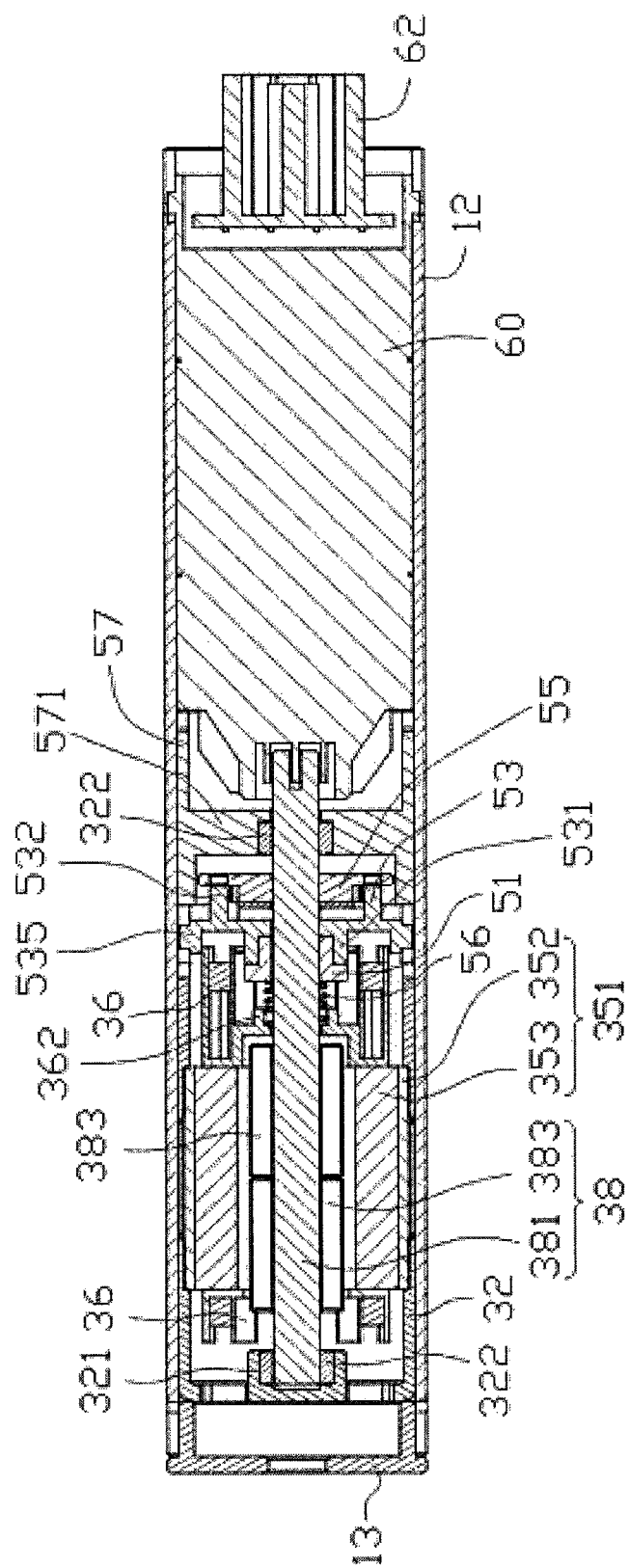
FIG. 6 is a sectional view of the rolling shutter driving device of FIG. 5 shown in another state.
Figure 7:
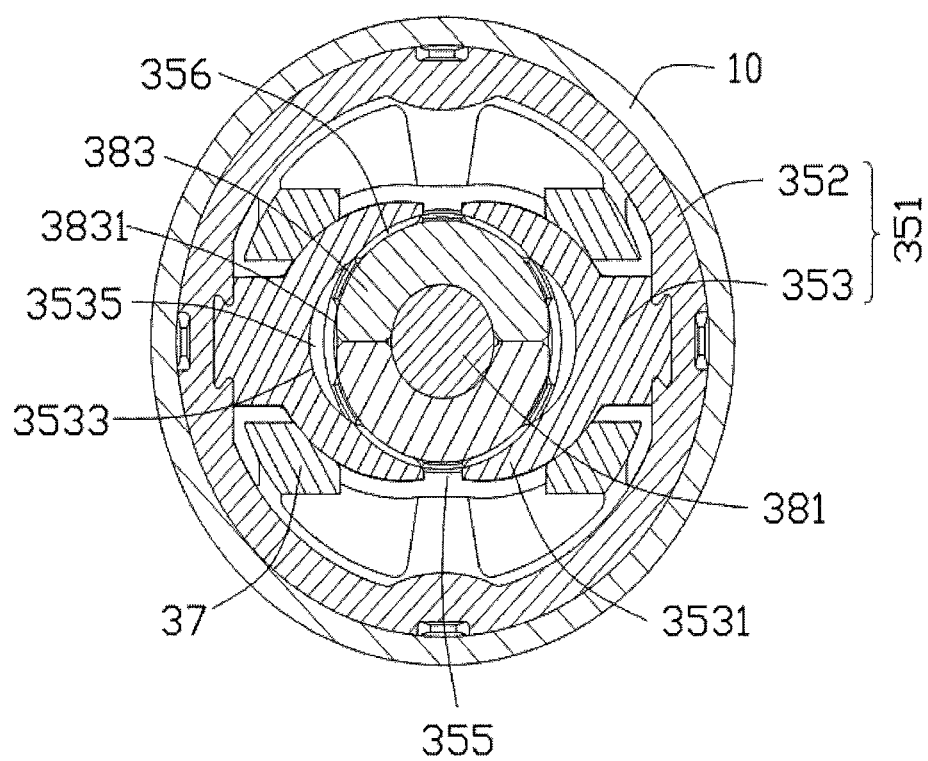
FIG. 7 is a sectional view of the rolling shutter driving device of FIG. 2, taken along line VII-VII thereof.

Referring to FIG. 6 and FIG. 7, the stator 35 includes a stator core 351 and a concentrated winding 37 directly or indirectly wound around the stator core 351. The stator core 351 includes the yoke 351 and a plurality of stator teeth 353 connected to the yoke 352. In this embodiment, the number of the stator teeth 353 is two. The two stator teeth 353 are disposed on an inner surface of the yoke 352 and are opposed to each other to define an accommodating space for accommodating the rotor 38. The yoke 352 is annular, and the stator teeth 353 extend inwardly from the yoke 352.

The two winding brackets 36 are attached round the stator teeth 353 to insulate the stator teeth 353 from the winding 37. The two winding brackets 36 are mounted to opposite ends of the stator teeth 353, respectively. In this embodiment, the two winding brackets 36 are different in axial size such that, when the two winding brackets 36 are mounted to the two ends of the stator teeth 353, an extension length of one of the winding brackets 36, which is located adjacent to the locking assembly 50, away from the stator 35 is greater than an extension length of the other one of the winding brackets 36, which is adjacent to the end cap 32, away from the stator 35. It should be understood that the winding bracket 36 adjacent to the locking assembly 50 extends a distance beyond one end of the yoke 352 of the stator 35 and, therefore, the winding 37 wound around the winding bracket 36 extends outside the yoke 352 of the stator 35. An electromagnetic force generated by the portion of the winding 37 extending outside the yoke 352 can better attract the locking assembly 50.

The rotor 38 includes a rotary shaft 381 and a rotor main body 383 mounted on the rotary shaft 381. In this embodiment, the rotor main body 383 includes two groups of permanent magnets that are axially arranged. Each group of permanent magnets includes two semicircular magnets that cooperatively define a hollow cylindrical structure. Each group of permanent magnets forms a plurality of permanent magnetic poles. The two groups of permanent magnets are attached around the rotary shaft 381, with the two permanent magnets of each group opposed to each other. In particular, two adjacent ends of the two groups of cylindrical permanent magnets closely fit with each other. In an alternative embodiment, the rotor main body 383 may further include a rotor core disposed between the rotary shaft 381 and the permanent magnet. The permanent magnet may also be an integral annular magnet. One end of the rotary shaft 381 opposite from the end cap 32 passes through the locking assembly 50 to connect with the gearbox 60.

Figure 10:
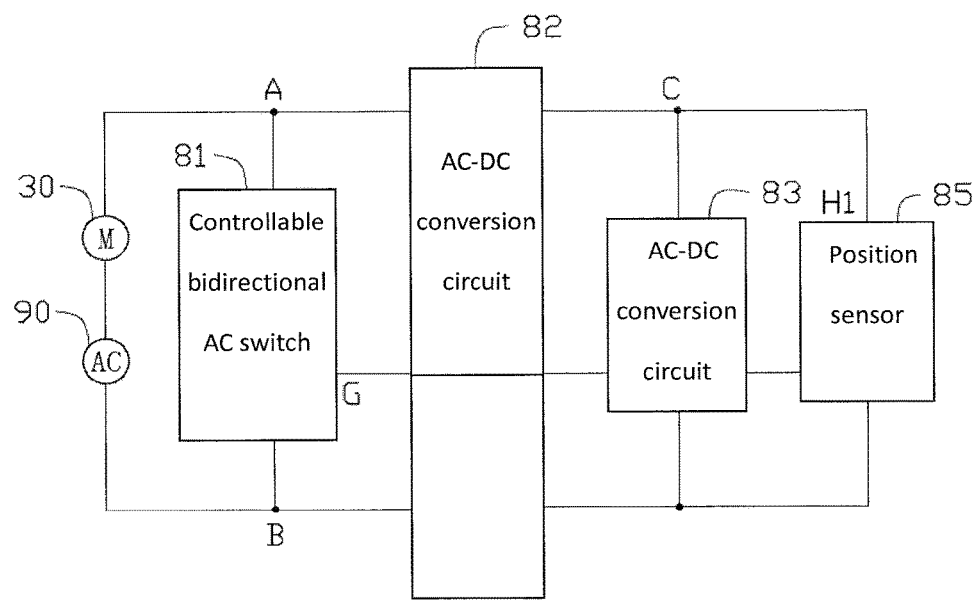
FIG. 10 is a block diagram of a motor driving circuit of a rolling shutter driving device according to one embodiment of the present invention.

FIG. 7 is a sectional view of the motor 30 of the rolling shutter driving device 100 of the present invention. Each stator tooth 353 includes a pole shoe 3531. The two pole shoes cooperatively define a generally circular hollow chamber for rotatably accommodating the rotor 38. Slot openings 355 are formed at connecting areas between the two pole shoes 3531. A pole arc face 3533 of each pole shoe 3531 and an outer surface of the rotor 38 define therebetween an air gap 356. A positioning groove 3535 is defined in each pole arc face 3533. Preferably, a major portion of each pole arc face 3533 other than the positioning groove 3535 is located on a cylindrical surface concentric with the rotor, such that each pole arc face 3533 and the rotor permanent magnet form a substantially even air gap therebetween. Since the motor 30 is a single phase synchronous motor in this embodiment, the provision of the positioning groove 3535 can make an initial position of the rotor deviate from a dead point position (i.e. a position where the rotor pole is aligned with the stator pole/tooth), thus avoiding motor startup failure. In this embodiment, the positioning groove 3535 is circular arc-shaped and, when viewed along the direction of the axis of the rotary shaft 381, a perpendicular bisector of the circular arc of a projection of the positioning groove 3535 coincides with a perpendicular bisector of a projection of the stator tooth 353. This configuration provides the motor 30 with a bidirectional startup capability and its startup direction is controlled by a driving circuit 80 (FIG. 10). It should be understood that it is also possible to deviate a center of the positioning groove 3535 from a center of the pole arc face 3533 of the stator tooth 353, in which case the motor 30 has greater startup capability in one direction than in the other.

It should be understood that an outer circumferential surface of the rotor main body 383 is formed with two symmetrical mating faces 3831. In this embodiment, the mating faces 3831 are planes, and each mating face 3831 extends on the outer circumferential surface of the rotor main body 383 along the direction of the axis of the rotary shaft 381.

Figure 8:
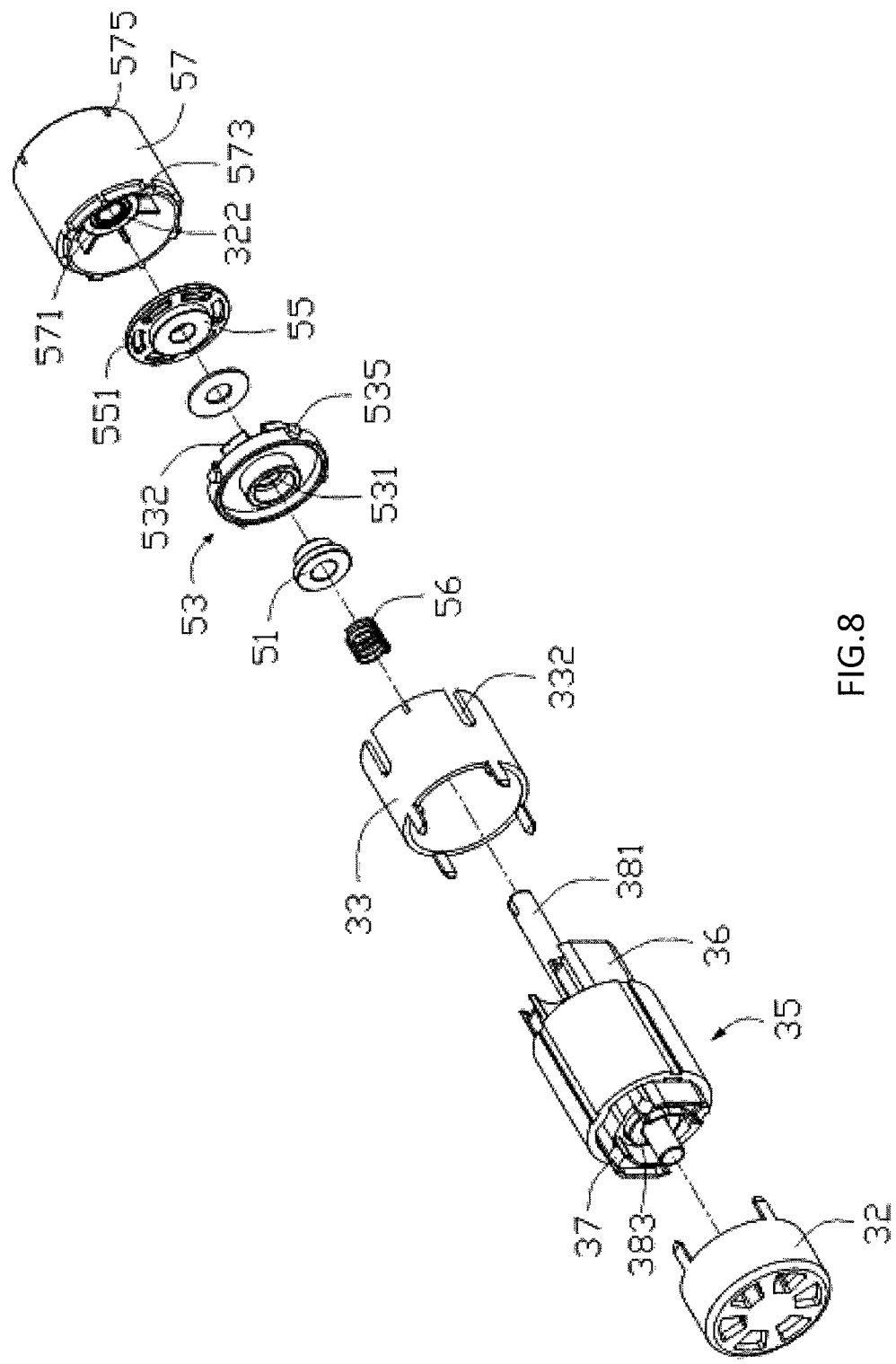
FIG. 8 is an exploded view of the rolling shutter driving device of FIG. 2.
Figure 9:
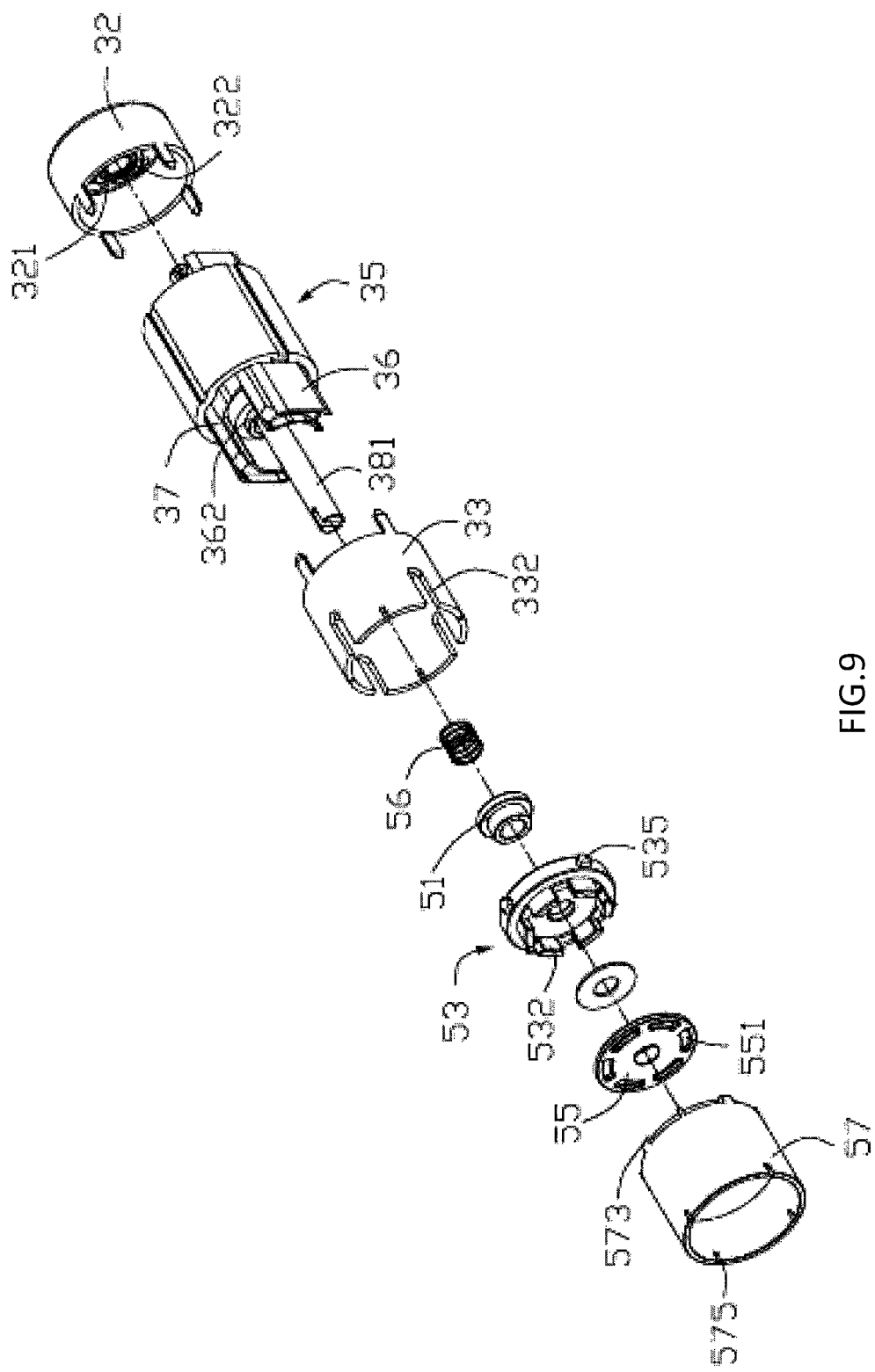
FIG. 9 is an exploded view of the rolling shutter driving device of FIG. 2, viewed from another aspect.

Referring to FIG. 8 and FIG. 9, the locking assembly 50 includes a magnetic conductive ring 51, a brake pad 53, a rotary member 55, a resilient element 56, and a sleeve 57. The magnetic conductive ring 51 is slidingly fitted around one end of the rotary shaft 381 opposite from the end cap 32. The brake pad 53 is generally in the form of a hollow annular structure. The brake pad 53 is attached around the rotary shaft 381. In this embodiment, one side of the brake pad 53 forms an accommodating portion 531 for accommodating the magnetic conductive ring 51, such that the magnetic conductive ring 51 is able to drive the brake pad 53 to move when the magnetic conductive ring 51 moves under the electromagnetic force of the motor 30. In this embodiment, the magnetic conductive ring 51 may be fixedly mounted on the brake pad 53 through interference-fit or over-molding, as long as the two elements can move together along the axial direction of the rotary shaft 381. The other side of the brake pad 53 forms a plurality of extensions 532 for locking the rotary member 55. An outer circumferential side of the brake pad 53 forms a plurality of sliding blocks 535. Each sliding block 535 is slidably accommodated in a corresponding one of the limiting slots 332 of the housing 33 such that a position of the brake pad 53 in the rotational direction of the rotary shaft 381 is limited by the housing 33 of the motor 30, i.e. the brake pad 53 is fixed relative to the housing 33 in the circumferential direction.

Preferably, the rotary member 55 is fixedly mounted on one end of the rotary shaft 381 passing through the brake pad 53. The rotary member 55 defines a plurality of through holes 551. Each extension 532 of the brake pad 53 is selectively engaged in one of the through holes 551 to lock the rotary member 55. The resilient element 56 is attached around the rotary shaft 381. In this embodiment, the resilient element 56 may be an element that can automatically restore to its original shape from a forced deformed state, such as, a spring or a resilient plastic member. The resilient element 56 has one end abutting against the winding bracket 36 and the other end abutting against the magnetic conductive ring 51. The resilient element 56 is used to urge the magnetic conductive ring 51 and the brake pad 53 to slide along the rotary shaft 381 to lock or unlock the rotary member 55. It should be understood that one end of the winding bracket 36 adjacent the resilient element 36 forms a receiving portion 362 for partially receiving the resilient element 56.

It should be understood that the extensions 532 and the sliding blocks 535 are each arranged circumferentially, and are evenly disposed on one side of the brake pad 53 and the outer circumferential side of the brake pad 53. The through holes 551 are arranged circumferentially and evenly disposed in the rotary member 55.

The sleeve 57 is in the form of a cylindrical structure. A bearing seat 571 is disposed in an interior of the sleeve 57, for cooperating with the end cap 32 to support the rotor 38. One end of the sleeve 57 is provided with a plurality of engagement blocks 573. Each engagement block 573 is engaged in one of the limiting slots 332 of the housing 33, with the sliding blocks of the brake pad 53 located between the housing 33 and the engagement blocks 573. One end of the sleeve 57 opposite from the motor 30 is connected to the gearbox 60. In this embodiment, the other end of the sleeve 57 is formed with a plurality of engagement slots 575 for clamping the gearbox 60. In an alternative embodiment, the sleeve 57 and the gearbox 60 may be connected by adhering or soldering other than clamping.

The gearbox 60 includes a plurality of transmission gears (not shown) and a transmission member 62 that are mounted in the gearbox. The transmission gears are directly or indirectly connected to the rotary shaft 381. One end of the transmission member 62 is connected to the transmission gears, and the other end is connected to a rolling shutter 300. The rotary shaft 381 drives the transmission gears to rotate, which in turn drive the transmission member 62 to drive the rolling shutter 300 to retract or extend.

Referring to FIG. 10, the motor 30 in accordance with the embodiment of the present invention further includes a driving circuit 80. The driving circuit 80 is disposed in a control panel (not shown) of the motor 30. The driving circuit 80 at least includes a controllable bidirectional AC switch 81, an AC-DC conversion circuit 82, a switch control circuit 83, and a position sensor 85. Preferably, the motor 30 is a single phase synchronous motor.

In the driving circuit 80, the winding 37 of the motor 30 and an AC power supply 90 are connected in series between a first node A and a second node B of the driving circuit 80. The AC power supply 90 is preferably a mains AC supply, with a fixed frequency of, for example, 50 Hz or 60 Hz, and a voltage of, for example, 110V, 220V, or 230V.

The controllable bidirectional AC switch 81 is connected in parallel with the series-connected winding 37 and AC power supply 90 between the two nodes A and B. The controllable bidirectional AC switch 81 is preferably a three-terminal bidirectional thyristor (TRIAC), with two anodes thereof connected with the two nodes A and B, respectively. It should be understood that the controllable bidirectional AC switch 81 may also be implemented for example by two silicon-controlled rectifiers reversely connected in parallel, and a corresponding control circuit is provided to control the two silicon-controlled rectifiers in a predetermined manner. The AC-DC conversion circuit 82 and the controllable bidirectional AC switch 81 are connected in parallel between the two nodes A and B. The AC-DC conversion circuit 82 converts an alternating current between the two nodes A and B into a low-voltage direct current. The position sensor 85 can be powered by the low-voltage direct current output from the AC-DC conversion circuit 82, and is configured to detect the magnet pole position of the permanent magnet rotor 38 of the motor 30 and output a corresponding signal. The switch control circuit 83 is connected with the AC-DC conversion circuit 82, the position sensor 85 and the controllable bidirectional AC switch 81, and is configured to control the controllable bidirectional AC switch 81 to switch between on and off states in a predetermined manner according to magnet pole position information of the rotor 38 detected by the position sensor 85 and polarity information of the AC power supply 90 acquired from the AC-DC conversion circuit 82, such that the winding 37 drives the rotor 38 to rotate only along a fixed starting direction in a motor startup stage. In the present invention, when the controllable bidirectional AC switch 81 is switched on, the two nodes A and B are shorted, and the AC-DC conversion circuit 82 does not consume power any more since no current flows therethrough, thereby greatly improving the utilization efficiency of the electric energy.

The switch control circuit 83 includes three terminals connected to a relatively high voltage output terminal C of the AC-DC conversion circuit 82, an output terminal H1 of the position sensor 85, and a control terminal G of the three-terminal bidirectional thyristor.

The working process of the rolling shutter driving device 100 is described below with reference to the drawings. The rolling shutter driving device 100 is assembled, with its transmission member 62 connected to the rolling shutter 300. For ease of description, the state of the rolling shutter driving device 100 that is power off is defined as an initial state. In the initial state, no electrical current flows through the motor 30, the concentrated winding 37 of the stator 35 generates no electromagnetic force, and the magnetic conductive ring 51 moves in a direction away from the motor 30 along the rotary shaft 381 under the spring force of the resilient element 56, until the magnetic conductive ring 51 pushes the brake pad 53 connected thereto to be engaged with the rotary member 55. At this time, the extensions 532 of the brake pad 53 are engaged in the respective through holes 551, the sliding blocks 535 of the brake pad 53 are engaged in the limiting slots 332 of the housing 33, and the brake pad 53 cannot rotate relative to the rotary shaft 381. Therefore, the rotary shaft 381 that is fixedly connected with the rotary member 55 cannot rotate, either, by means of the engagement between the brake pad 53 and the rotary member 55, and the whole rotor 38 of the motor 30 is thus locked with the housing 33.

When the motor 30 is powered on, the concentrated winding 37 of the stator 35 generates an electromagnetic force. Under the action of the magnetic force, the magnetic conductive ring 51 drives the brake pad 53 to slide along the rotary shaft 38 toward the winding 37 against the spring force of the resilient element 56. At this time, the sliding blocks 535 slide along their respective limiting slots 332 away from the rotary member 55, such that the extensions 532 of the brake pad 53 are disengaged from their respective through holes 551 to unlock the rotor 38 of the motor 30 from the housing 33. As a result, the rotary shaft 381 rotates under the electromagnetic force of the stator 35, thereby driving the gearbox 60 connected to the end of the rotary shaft 381 to operate which in turn drives the rolling shutter 300 to rotate.

When it is desired to stop the rolling shutter 300 at a preset position, the power supply to the motor 30 is cut off. The rolling shutter driving device 100 restores to its initial state, and the rolling shutter 300 is locked with the housing 33 through the rotary shaft 381.

Preferably, in this embodiment, the motor 30 of the rolling shutter driving device 100 of the present invention has an input voltage of 230V, a frequency of 50 Hz, a rotation speed of 3000 rpm, an efficiency of 27.63%, a diameter of a cross-section of 41.5 mm, and a length of 124 mm.

In the rolling shutter driving device 100 of the present invention, the brake pad 53 slidingly fitted on the rotary shaft 381 is pushed to be engaged in the rotary member 55 that is fixedly connected to the rotary shaft 381 by the spring force of the resilient element 56 disposed between the stator 35 and the brake pad 53, and the brake pad 53 and the housing 33 of the motor 30 are fixed relative to each other in the circumferential direction, thereby locking the rotary shaft 381 with the housing 33 and hence holding the rolling shutter 300 in position. In addition, the brake pad 53 is driven to move toward the stator 35 by the electromagnetic force of the motor 30 to unlock the rotary shaft 381 from the housing 33. The rolling shutter driving device 100 has a simple construction and achieves stable locking of the rolling shutter 100. Moreover, the motor 30 is a single phase synchronous motor which is capable of providing more stable rotation speed and has improved efficiency, reduced size and weight in comparison with asynchronous motors.

In the above embodiments, the single phase synchronous motor has two permanent magnetic poles and two stator poles/teeth. It should be understood that the motor may also have four, six, eight permanent magnetic poles and four, six, eight stator poles/teeth.

It should also be understood that the rotary member 55 and the motor rotary shaft 381 may be connected by interference-fit or by engagement between a flat portion and an engagement block such that the two elements are fixed relative to each other in the circumferential direction and the axial direction.

The technical solutions of the embodiments of the present invention have been clearly and completely described above with reference to the accompanying drawings. Apparently, the embodiments as described above are merely part of, rather than all, embodiments of the present invention. Based on the embodiments of the present disclosure, any other embodiment obtained by a person skilled in the art without paying any creative effort shall fall within the protection scope of the present invention.

The invention claimed is:

1. A rolling shutter driving device comprising:
    a gearbox;
    a motor comprising a stator and a rotor rotatable relative to the stator, the rotor comprising a rotary shaft connected to the gearbox, the rotary shaft of the motor being configured to drive through the gearbox a rolling shutter connected to one end of the gearbox; and
    a locking assembly comprising a brake pad circumferentially fixed relative to the stator and a rotary member circumferentially fixed relative to the rotary shaft, the rotary member being fixed relative to the rotary shaft, the brake pad being slidable axially relative to the rotary shaft between a locking position where the brake pad is engaged with the rotary member to lock the rotary shaft and hence hold the rolling shutter in position, and an unlocking position where the brake pad is disengaged from the rotary member to unlock the rotary shaft,
    wherein the brake pad comprises a plurality of extensions engaged with the rotary member.

2. The rolling shutter driving device of claim 1, wherein the locking assembly further comprises a magnetic conductive ring and a resilient element, the magnetic conductive ring is slidingly fitted on the rotary shaft and keeps connecting with the brake pad, the resilient element resists against the brake pad thereby forcing the brake pad towards the locking position, the stator of the motor comprises the winding, which, once energized, generates an electromagnetic force to force the magnetic conductive ring and the brake pad to move axially along the rotary shaft towards the unlocking position overcoming a resilient force of the resilient element.

3. The rolling shutter driving device of claim 2, wherein the motor further comprises an end cap disposed at an end of the stator, the locking assembly is disposed at an end of the motor far away from the end cap, the rotor is supported by the end cap and the locking assembly, and the rotor rotates around the stator under the action of the electromagnetic force of the winding.

4. The rolling shutter driving device of claim 3, wherein the motor further comprises a housing fixed disposed at an end of the stator opposite to an end cap and close to the locking assembly, the housing of the motor is formed with a plurality limiting slots extending axially, an outer circumferential side of the brake pad is provided with a plurality of sliding blocks, each sliding block is fitted in a corresponding one of the limiting slots, and axially slidable in the corresponding limiting slot.

5. The rolling shutter driving device of claim 4, wherein the locking assembly further comprises a sleeve with a bearing seat disposed therein, a bearing is mounted in the bearing seat to support one of two opposite ends of the rotary shaft, one end of the sleeve is connected to the housing of the motor, and the other end of the sleeve is connected to the gearbox.

6. The rolling shutter driving device of claim 5, wherein the end of the sleeve is provided with a plurality of engagement blocks each engaged in one of the limiting slots.

7. The rolling shutter driving device of claim 5, wherein the end cap comprises another bearing seat with another bearing received therein to support the other one end of the rotary shaft.

8. The rolling shutter driving device of claim 2, wherein the resilient element is sandwiched between the stator of the motor and the magnetic conductive ring.

9. The rolling shutter driving device of claim 8, wherein the stator comprises a yoke, a plurality of stator teeth radially extending from the yoke, a first winding bracket fixed to one of opposite axial ends of the plurality of the stator teeth close to the locking assembly, and a second winding bracket fixed to the other one axial end of the plurality of the stator teeth far away from the locking assembly, one of opposite axial ends of the yoke abuts the housing of the motor.

10. The rolling shutter driving device of claim 9, wherein the first winding bracket defines a receiving portion, one end of the resilient element is received in the receiving portion and resists against the first winding bracket, the other end of the resilient element resists against the magnetic conductive ring.

11. The rolling shutter driving device of claim 9, wherein the first winding bracket axially extends a distance beyond the yoke, such that the winding mounted on the first winding brackets is partially located outside the yoke of the stator.

12. The rolling shutter driving device of claim 1, wherein one side of the brake pad is provided with an accommodating portion for accommodating a magnetic conductive ring, the other side of the brake pad is provided with the plurality of extensions, and the extensions are engaged with the rotary member in response to the event that the brake pad moves to the locking position.

13. The rolling shutter driving device of claim 1, wherein the rotary member defines a plurality of through holes, each extension is selectively engaged in one of the through holes in response to the event that the brake pad moves to the locking position.

14. The rolling shutter driving device of claim 1, wherein the extensions of the brake pad and a plurality of through holes of the rotary member are arranged circumferentially, and are respectively disposed on brake pad and rotary member at even interval.

15. The rolling shutter driving device of claim 1, wherein the gearbox comprises a plurality of transmission gears and a transmission member mounted in the gearbox, the transmission gears are directly or indirectly connected to the rotary shaft, the transmission member is connected to the rolling shutter, and the rotary shaft drives the plurality of transmission gears to rotate which in turn drive the transmission member to drive the rolling shutter to rotate.

16. The rolling shutter driving device of claim 1, wherein the rolling shutter driving device further comprises a outer shell receiving the motor and the gearbox.

17. A rolling shutter apparatus comprising:
a rolling shutter, and
a rolling shutter driving device configured to drive the rolling shutter to retract or extend, the rolling shutter driving device comprising:
a motor including a stator and a rotor rotatable relative to the stator, the rotor comprising a rotary shaft configured to drive the rolling shutter by a gearbox; and
a locking assembly including a brake pad slidingly fitted on the rotary shaft and a rotary member fixedly mounted to the rotary shaft, the brake pad being fixed relative to the stator of the motor in a rotational direction of the rotary shaft and further having a plurality of extensions engaged with the rotary member, the brake pad being slidable relative to the rotary shaft so as to be selectively engaged with the rotary member to lock the rotary shaft and hence hold the rolling shutter in position, or disengaged from the rotary member to unlock the rotary shaft.

18. The rolling shutter apparatus as described in claim 17, wherein the rotary member comprises a plurality of through holes engaged with the plurality of extensions of the brake pad.

19. The rolling shutter apparatus as described in claim 17, wherein the locking assembly further comprises a magnetic conductive ring slidingly fitted on the rotary shaft, and a resilient element for providing a spring force to brake pad.

20. A rolling shutter driving device comprising:
a gearbox;
a motor comprising a stator and a rotor, the rotor comprising a rotary shaft connected to the gearbox, the rotary shaft of the motor being configured to drive a rolling shutter by the gearbox; and
a locking assembly comprising a brake pad circumferentially fixed relative to the stator and a rotary member circumferentially fixed relative to the rotary shaft, the brake pad being slidable axially relative to the rotary shaft and further comprising a plurality of extensions for engaging the rotary member such that the brake pad is in a locked position.

\* \* \* \* \*